Patented May 3, 1949

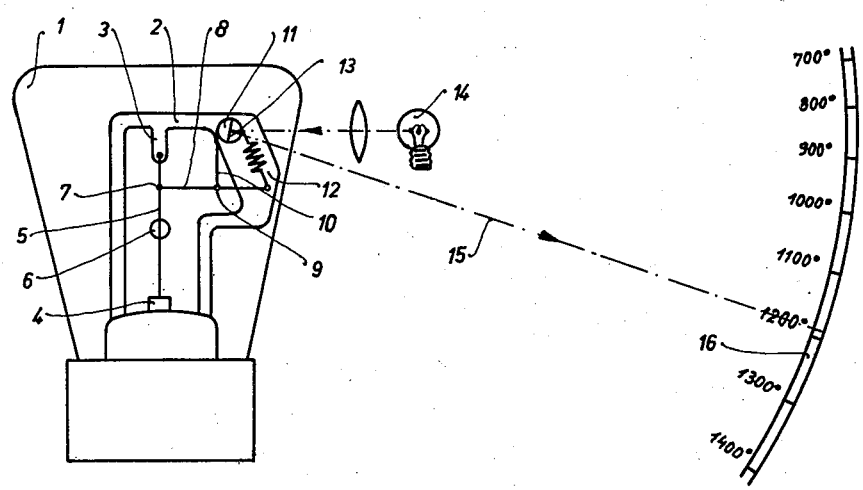
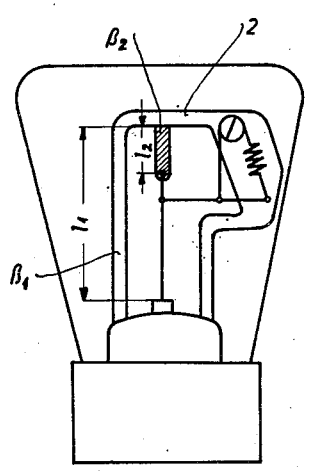
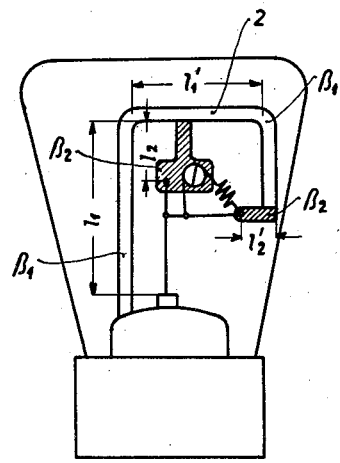

2,469,115

UNITED STATES PATENT OFFICE 2,469,115

PYROMETER LAMP FOR OPTICAL TEMPERATURE MEASUREMENTS

Adolf Jagersberger, St. Gilgen, Austria

Application February 26, 1948, Serial No. 11,291
In Austria February 4, 1947

Section 1, Public Law 690, August 8, 1946

5 Claims. (Cl. 315—120)

This invention relates to a pyrometer lamp for optical temperature measurement. For the partial radiation optical pyrometers employed for measuring high temperatures, pyrometer lamps are used, whose luminous intensity is assimilated by altering the incandescent filament current to the luminous intensity of the radiators to be measured. The current intensity is then a standard for the luminous intensity of the radiator and therefore also for temperature.

Hitherto precision galvanometers in the form of moving coil instruments have been used for measuring current. The disadvantage in the use of precision instruments in technical pyrometers is due to the circumstance that these instruments are extremely sensitive to the mechanical shocks which are unavoidable in working conditions, and the accuracy of the indication drops very considerably in the event of not particularly careful treatment, owing to damage to the fine bearings and the friction at the points thereby caused. Furthermore, for measurements in steel works, foundries, and ceramic factories, fine dust cannot be prevented from finding its way into the pyrometer housing and adhering to the fine bearings of the ammeter, whereby additional friction errors and therefore serious errors in the temperature reading occur. A further drawback to using moving coil instruments reside in the fact that the weight of the pyrometer, owing to the considerable weight of the field magnet, is appreciable; this is a serious impediment to permanent measurements, since through the effort of holding it, concentration on the pyrometer adjustment is relaxed and the reliability of the measurement suffers.

For these reasons, another known solution, under the name of "crossed wire pyrometer" was proposed some time ago, in which the galvanometer was superfluous. The drawback of this device consists of the fact that two adjustments have to be made, viz. first the setting of the crossed wire lamp and then the measurement of temperature. Two controls there have to be operated.

According to the invention, all these drawbacks are avoided by not taking the current intensity as the standard for the temperature of the incandescent filament, but instead the expansion of the filament, which is indicated by some suitable means.

The accompanying drawing shows schematically by way of example, a form of carrying the invention into practice;

Fig. 1 shows the complete device, while Figs. 2 and 3 show two different constructional forms of the supporting system of the measuring system with temperature compensation.

In a housing 1 there is a frame 2 with extensions 3 and 4 to which are attached the pyrometer wire 5. The measurement point, whose brightness is compared with that of the radiator, is denoted by 6. A thin wire 8 is attached on the one hand at 7 to the pyrometer wire 5 and on the other hand to the support 2. A second thin wire 10 is attached at one end at 9 to the wire 8 and at the other hand, via a roller 11 pivotally carried in the housing, is taken to one end of a spring 12, the other end of which is attached to the support. To the roller 11 there is rigidly connected a reflector 13, which projects the ray of light 15 proceeding from a source of light 14 on to a scale 16. Thus after the manner of a hot wire instrument, the alteration in length of the pyrometer wire is transformed via the wires 8 and 10 into a rotational movement of the reflector 13, and is projected directly on to the scale. The whole measuring system is thus arranged in the vacuum of the pyrometer lamp and is therefore insensitive to the action of dust and also to chemical action through industrial gases, which are generally present where high temperatures are measured. Permanent unchangeability and intensitivity to dirt and corrosion are thus ensured. At the same time, the insensitivity of the pyrometer to mechanical impacts is enhanced, since the only moving part, viz. the small roller 11 can be made very light, especially if the reflector is directly ground on to it, and the total weight is far less than that of the measuring system of a moving coil instrument. In addition to these features, the low weight of such a pyrometer lamp, which represents a combination of the pyrometer lamp proper with the measuring instrument, has an extremely favourable effect in reducing the weight of the apparatus.

If the pyrometer lamp is to be used with a constant luminous intensity, it suffices to make a single mark instead of a scale.

With such a pyrometer lamp it is moreover possible, by giving the roller 11 a suitable shape, to form the scale in the desired manner. Thus, for instance, it is possible to achieve a completely linear temperature scale, or else a scale whose divisions are made according to the desired accuracy at each point. Whereas in pyrometer with moving coil instruments only about two thirds of the length of the scale can be used, in the device according to the invention, the useful scale length is not restricted.

Through the longitudinal expansion of the support carrying the pyrometer wire, the transmission wires and the roller with the reflector, there occurs as a rough approximation a relative reading error in the region $$\frac{\beta}{\alpha}t'$$

where $\alpha$ is the coefficient of expansion of the filament, $\beta$ that of the support and $t'$ variation of the temperature of the support from that on calibration. The support should therefore preferably be made of a material for which $\beta$ is very small. For practical purposes, a ratio of $$\frac{\beta}{\alpha}=0.1$$

is sufficient, for then, for example, a temperature change of the support of 30° only causes an error of 3°. The ratio 0.1 may readily be obtained by making the support of Invar steel.

By a construction according to Fig. 2, it is also possible to obtain complete compensation of the measuring error occurring by the expansion of the support. The incandescent filament is supported here by two supporting parts, consisting of different materials. It may be shown that then, if the lengths $l_1$ and $l_2$ of these supporting parts behave inversely as their coefficients of expansion, the support will be completely prevented from expanding.

In the constructional form of the invention according to Fig. 3, the lengths $l'_1$ and $l'_2$ moreover behave inversely as the coefficients of expansion $\beta_1$ and $\beta_2$, whereby all alterations in length acting on the support and influencing temperature measurement are compensated, so that the temperature of the entire support is without effect on measurement.

In order to obtain the speediest possible setting up of stationary temperature conditions in the pyrometer lamp, it is as well, instead of evacuating the lamp, to fill this with a gas of good heat conductivity, e. g. with hydrogen. The period required for temperature compensation will be reduced to a fraction compared with a vacuum lamp, and thus a more rapid effect of temperature compensation is obtained.

What I claim is:

1. In a pyrometer, an incandescent filament adapted to be passed by an electric current, means for laterally straining said filament, and means for indicating the amount said filament yields to said strain, when expanded by the current, said indicating means including a pivotally mounted reflector.

2. In a pyrometer, an incandescent filament adapted to be passed by an electric current, a frame supporting the ends of said filament, spring means to laterally strain said filament, a reflector pivotally mounted on said frame, and mechanical transmitting means to operatively connect said filament with said reflector so that the latter is rotated in response to the expansion of said filament owing to the heating effect of the current.

3. In a pyrometer, an incandescent filament adapted to be passed by an electric current, a frame to support the ends of said filament, a reflector rotatably mounted on said frame, a roller fixedly connected to said reflector, a wire extending substantially transversely to said filament and connected at one end to said filament between the ends of the latter, and at the other end to said frame, a second wire extending substantially transversely to and connected to the first named wire between the ends of the latter, said last named wire passing around said roller, and spring means to strain said wires and therefore also said filament.

4. In a pyrometer, a closed, transparent housing, an incandescent filament adapted to be passed by an electric current, spring means to laterally strain said filament, a reflector rotatably mounted, mechanical transmitting means to operatively connect said filament with said reflector so that the latter is rotated in response to the expansion of said filament owing to the heating effect of the current, a frame within said housing to support said filament and said reflector, a source of light outside said housing, adapted to emit a ray of light onto said reflector, and a stationary scale member outside said housing adapted to indicate a ray of light reflected by said reflector.

5. In a pyrometer, an incandescent filament, adapted to be passed by an electric current, a base carrying one end of said filament, a support member extending from said base substantially parallel with said filament, a second support member extending from the free end of said first named support member substantially parallel with, and oppositely to the latter, and carrying the other end of said filament, said support members being composed of different materials having different coefficients of expansion, the lengths of the respective support members being inversely proportional to their coefficients of expansion, spring means to laterally strain said filament, and means for indicating the amount said filament yields to said strain, when expanded by the current, said indicating means including a pivotally mounted reflector.

ADOLF JAGERSBERGER.

No references cited.